United States Patent [19]

Teich

[11] Patent Number: 5,277,157
[45] Date of Patent: Jan. 11, 1994

[54] MOUNTING ARRANGEMENT FOR AN AIR CLEANER

[75] Inventor: Michael Teich, Mannheim, Fed. Rep. of Germany

[73] Assignee: Deere & Company, Moline, Ill.

[21] Appl. No.: 14,937

[22] Filed: Feb. 8, 1993

[30] Foreign Application Priority Data

Feb. 11, 1992 [DE] Fed. Rep. of Germany ....... 4203864

[51] Int. Cl.$^5$ ............................................. F02B 77/00
[52] U.S. Cl. .............................. 123/198 E; 55/385.3; 55/510
[58] Field of Search ................. 123/195 A; 123/198 E; 55/495, 510, 385.3

[56] References Cited

U.S. PATENT DOCUMENTS

| | | | |
|---|---|---|---|
| 2,062,548 | 12/1936 | Wilson | 55/251 |
| 2,076,304 | 4/1937 | Strindberg | 55/379 |
| 3,992,177 | 11/1976 | Welteroth | 55/510 |
| 4,006,000 | 2/1977 | Tortorici et al. | 55/323 |
| 4,265,647 | 5/1981 | Donachiue | 55/315 |
| 5,137,557 | 8/1992 | Behrendt et al. | 55/493 |

Primary Examiner—Noah P. Kamen

[57] ABSTRACT

A mounting arrangement is provided for mounting the air cleaner for an internal combustion engine in a vehicle. The air cleaner generally includes a casing having air inlet and outlet openings and an open side, a pot-shaped housing containing a filter element and having an open side selectively attachable to the open side of the casing. The mounting arrangement provides two substantially parallel and horizontal rods upon which the air cleaner can be placed. The air cleaner can be held to the rods by a variety of techniques, including hooks and guide rings. The mounting structure allows the housing to be detached and slid away from the casing for cleaning or replacement of the filter element, then be accurately realigned with the casing so that an accurate seal can be engaged.

13 Claims, 6 Drawing Sheets

MOUNTING ARRANGEMENT FOR AN AIR CLEANER

BACKGROUND OF THE INVENTION

1. Field of the Invention

The invention concerns a mounting arrangement for the air cleaner of the internal combustion engine of a vehicle, where the air cleaner includes a casing and a pot-shaped housing that accommodates a filter element.

2. Description of the Related Art

U.S. Pat. No. 4,006,000 shows an air cleaner with a generally cylindrical housing and a tangential raw air inlet. The housing encloses a filter element through which air flows radially. The housing itself can be attached by a bayonet lock to a cylindrical intake air collector. A safety shield is located in this intake air collector to prevent entry of dust and dirt into the intake air duct during replacement of the filter element. The safety shield is sealed against the filter element by moving the filter element axially in the direction of the safety shield with an adjusting screw after engaging the bayonet lock, so that the end face of the filter element is brought into contact with the end face of the safety shield. This axial movement simultaneously secures the bayonet lock.

U.S. Pat. No. 5,137,557 describes an intake air cleaner for an internal combustion engine in which a filter element is arranged in a pot-shaped housing. The end face of the housing can be brought into contact with an attaching device that carries a locking arrangement. To secure the housing to the attaching device the locking ring is rotated and engages with sliding surfaces behind cams extending from the housing in the manner of a bayonet lock.

Problems can arise in the course of assembling the air cleaners described above during fastening of the housing to the casing. The bayonet lock requires exact alignment of the housing and casing before the bayonet lock is secured by rotation. Only if both components are aligned with each other and brought into contact without any angularity can the bayonet lock be secured without problems.

SUMMARY OF THE INVENTION

The object of the present invention is to provide a mounting arrangement for air cleaners of the type described above that overcomes the problems noted. The mounting arrangement should allow exact alignment of the housing and casing before they are connected to each other. Furthermore installation of the complete air cleaner in the vehicle structure, for example, on a vehicle frame, should be simple.

This object is achieved according to the invention by mounting two generally horizontal and parallel guide rods to the vehicle structure. The housing and/or the casing can be brought into contact with the guide rods so that they are in alignment with each other. Until they are fastened to each other or to the vehicle structure, the housing and casing can be moved axially with respect to each other on the guide rods.

In a preferred embodiment, the guide rods can extend from and be attached to two opposing plates of the vehicle structure. During assembly or a filter change, the generally cylindrical housing and/or the casing may very easily be set within the guide rods. They then are properly aligned axially with respect to each other and can be moved towards each other. By securing a lock, for example, by rotating a bayonet ring, the housing is connected and sealed to the casing.

The invention allows easy mounting of the housing and casing to the vehicle frame during the initial assembly or following repairs of the intake air cleaner. During assembly, the invention avoids misalignment of the housing relative to the casing, which would make it difficult, for example, to apply threaded or bayonet connections. In addition, the invention allows easy, exact repositioning, joining and locking of the housing and casing after a filter change.

The assembly simplification is particularly apparent with air cleaners in which both the raw air inlet and the clean air outlet are located in the casing. During a filter change, the housing and filter element can be very easily be disassembled from the casing, without disconnecting hoses or the like.

Preferably, guide means are attached to the housing and/or the casing through which the housing and/or the casing are supported on the guide rods. For example, concentric outer rings can be used as guide means, whose outer diameter is larger than the distance between the guide rods and in which the housing and/or the casing are supported on the rods. For a generally cylindrical housing and/or a generally cylindrical casing, the concentric outer rings can be attached easily. The use of equally large outer rings for the housing and the casing results automatically in centering of these two air cleaner housing components. They then can be moved along the guide rods in parallel. During assembly of the air cleaner, they can be moved towards each other and connected to each other, for example, by a bayonet ring.

There is a particular advantage in the provision of at least one pair of hook-shaped projection on the housing and/or the casing to engage the guide rods. With this structure, either the housing, the casing or the entire air cleaner can be hooked by the projection onto the forward guide rod during assembly and then swung to the rear about the projection until the housing, the casing or the entire air cleaner is brought into contact with the rear guide rod with a second, rear projection. With this structure, the assembly is very simple, reliable and time-saving.

A preferred embodiment of the invention provides at least one guide rod with a thread in one end region which can accept a flanged nut to secure the casing to the vehicle structure with particular simplicity. The threaded section extends outward through a part of the vehicle structure. By tightening the flanged nut a projection on the casing can be clamped between the vehicle structure and the flanged nut.

Preferably at least one hook-shaped projection on the housing is open downward and is provided with a cylindrical recess on the side facing the casing. This recess is oriented concentric to the associated guide rod when the air cleaner is assembled and is open downward through a slot to allow insertion of the guide rod during assembly. A rubber cylinder is attached to the associated guide rod which engages the recess when the air cleaner is closed and secures the housing against lifting away from the guide rod.

If the intake air cleaner housing is equipped with a direct bayonet lock connection between the casing and the housing which can be locked by rotating the housing relative to the casing, the opening in the hook-shaped projection preferably is extended to such a length in the circumferential direction that it encloses the guide rod during rotation of the housing in the closing operation.

If, for example, the projections associated with the two guide rods are provided with slots that are long in the circumferential direction, then the projections enclose the guide rods after rotating and locking of the housing. The housing is thereby secured to the guide rods, and no additional locking device is needed.

Since there may be clearance between the guide rod and the recess, the guide rods preferably have rubber sleeves in the region of the projections, avoiding metal-to-metal contact and providing noise damping.

BRIEF DESCRIPTION OF THE DRAWINGS

The invention will be further described with reference to the drawings, in which.

DETAILED DESCRIPTION OF THE PREFERRED EMBODIMENTS

Figure 1:
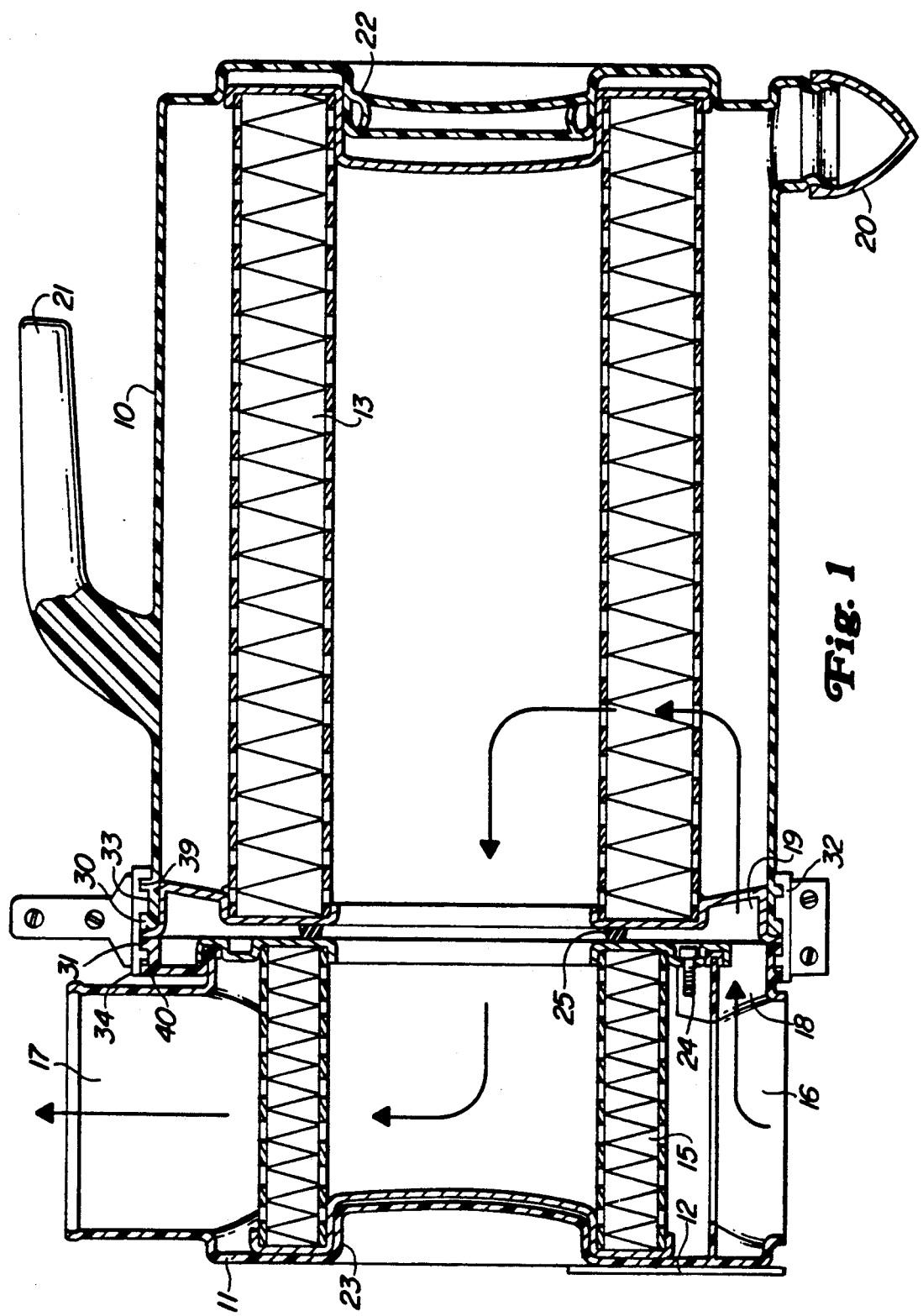
FIG. 1 is a longitudinal sectional schematic showing the general operation an air cleaner in assembled condition.

FIG. 1 generally illustrates the operation of a cylindrical air cleaner and housing according to the invention. The overall structure has two basic parts, a housing 10 and a casing 11. The housing 10 encloses a replaceable filter element 13 and can be attached to the casing 11. A safety shield 15 is located within the casing 11 to prevent the entry of dirt into the intake air side during replacement of the filter element 13.

The housing 10 and casing 11 are generally cylindrical and pot-shaped. The raw air inlet 16 and the clean air outlet 17 are located in the casing 11. The raw air flows in the direction of the arrow through the raw air inlet 16 into the outer chamber 18 of the casing 11, and from there through an axial vortex 19 into the outer chamber of the housing 10. After the air has passed through the filter element 13 it flows through the safety shield 15 to the clean air outlet 17.

The housing 10 is provided with a dust discharge valve 20 as well as with a handgrip 21. The filter element 13 is seated under pre-load with its closed end on a projection 22 provided in the housing. The safety shield 15 is also secured in the casing 11 on a projection 23, where the safety shield 15 is additionally fastened by a threaded connection 24 to the casing 11, so as to assure that the safety shield 15 cannot fall out when the housing 10 is removed. A radial seal 25 is provided on the open end face of the filter element 13. This seals the space between the filter element 13 and the safety shield 15. Such a seal assures a high degree of operating safety, in particular under shock and vibrations. However, it is evident that this type of seal is not able to absorb shear forces. Therefore the housing 10 is attached to the casing 11 only by means of an axial movement of the housing 10 and an axial pre-load.

The housing 10 and the casing 11 are provided on each of their circumferences with cams 30, 31 equally distributed over their entire circumference in the area of the mating end faces. The cams 30, 31 are enclosed by a bayonet or locking ring 32. This locking ring 32 is provided with wedge-shaped surfaces (sliding surfaces 33, 34) that are also arranged at several locations distributed around the entire circumference. The connection between the cams 30, 31 and the sliding surfaces 33, 34 is established by rotating the locking ring 32 in the circumferential direction so as to secure the housing 10 to the casing 11. This bayonet-type attachment avoids both rotational and radial movement of the housing 10 during assembly, so that no shear forces of any kind are applied to the radial seal 25.

Figure 2:
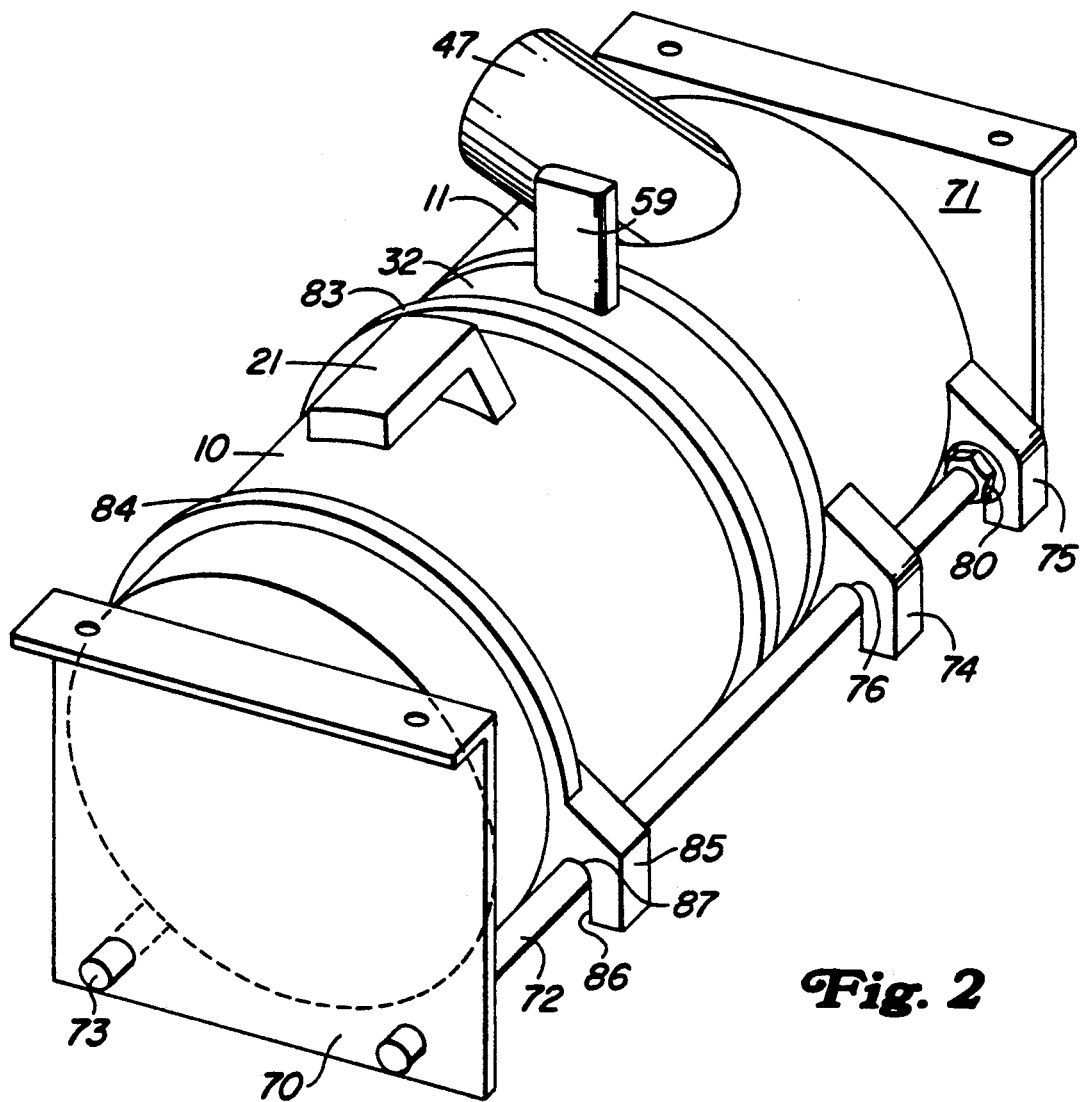
FIG. 2 is a perspective view of a first embodiment of a mounting arrangement for an air cleaner according to the invention.

FIG. 2 depicts a first embodiment of a mounting arrangement for air cleaners according to the invention. An intake air cleaner is supported on two horizontal rods 72, 73 oriented parallel to each other and extending between two opposite parallel side surfaces 70, 71 that are components of a vehicle frame (not otherwise shown). The rods 72, 73 are rigidly attached to the side plate 70, shown at the left in FIG. 2, while threaded attachments are provided at the right side plate 71.

The air cleaner generally includes a housing 10, a casing 11 and a locking ring 32 operating as a bayonet lock which carries a projecting lever 59 by means of which the locking ring 32 can be rotated to open or close the air cleaner. The clean air outlet 17 can be seen on the casing 11. A handgrip 21 is attached to the housing 10 to simplify assembly.

The generally cylindrical casing 11 carries two pairs of downward opening hook-shaped projections 74, 75 on each side on its outer surface somewhat below its cylindrical axis. (Only one hook of each pair is visible in FIG. 2.) The projections 74, 75 enclose the guide rods 72, 73 and support the casing 11 with each of its upper fillets 76, 77 on the guide rods 72, 73.

The projections 74 located in the vicinity of the locking ring 32 provide support for the casing 11 on the guide rods 72, 73, whereas the projections 75 located on the side of the casing 11 facing the side plate 71 provide support as well as attachment.

Figure 9:
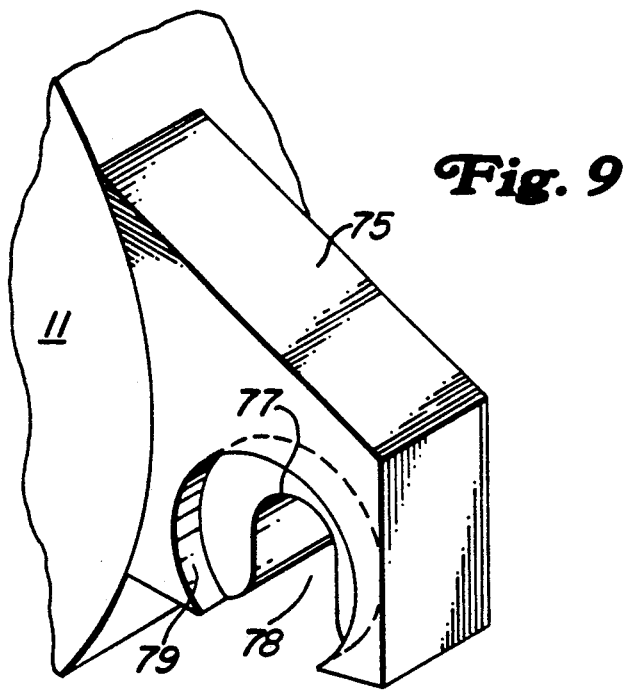
FIG. 9 is a perspective view of a hook-shaped projection of the casing of FIG. 2 or FIG. 5.

One of the projections 75 is shown in FIG. 9 in an enlarged perspective view. The cross section view of FIG. 10 shows the interaction between the guide rod 72, the projection 75 and the side plate 71 in the assembled condition.

Figure 10:
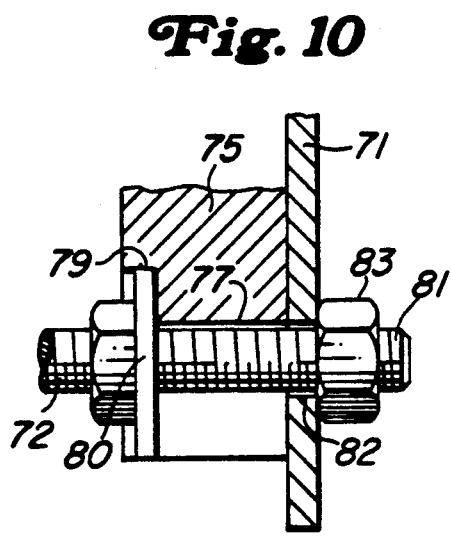
FIG. 10 is a longitudinal section through the hook-shaped projection of FIG. 9.

As shown in FIGS. 9 and 10, the projection 75 is provided with a slot 78 open downward that ends at the top in a cylindrical fillet 77, in which the projection 75 is supported on the guide rod 72. The slot 78 widens towards the bottom to permit easier insertion of the guide rod 72 during assembly of the air cleaner. On the side away from the side plate 71 the projection 75 is provided with a recess 79 oriented concentric to the fillet 77. When assembled, a washer-shaped flange of a flanged nut 80, which can be threaded onto the guide rod 72, engages this recess 79. The free end 81 of the guide rod 72, which is threaded extends through a bore 82 in the side plate 71. When a nut 94 is applied to the free end 81 of the guide rod 72 and the flanged nut 80 is turned, the projection 75 can be clamped between flanged nut 80 and side plate 71.

Returning to FIG. 2, the outer contour of the generally cylindrical housing 10 carries two concentric outer rings 83, 84 whose outer diameter is larger than the distance between the guide rods 72, 73. The housing 10 is supported by these outer rings 83, 84 on the guide rods 72, 73) in such a way that it is oriented concentric to the casing 11. Pairs of hook-shaped projections 85 extend and open downward on both sides of the housing 10 near the outer ring 84 (only one is visible in FIG. 2).

Figure 4:
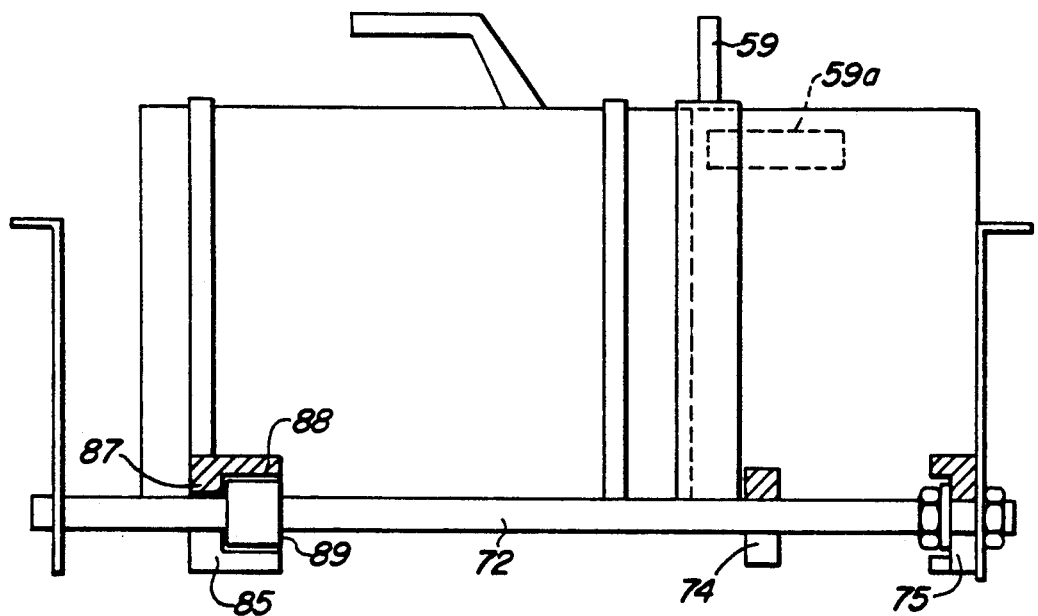
FIG. 4 is a view corresponding to FIG. 3 with the air cleaner closed.
Figure 8:
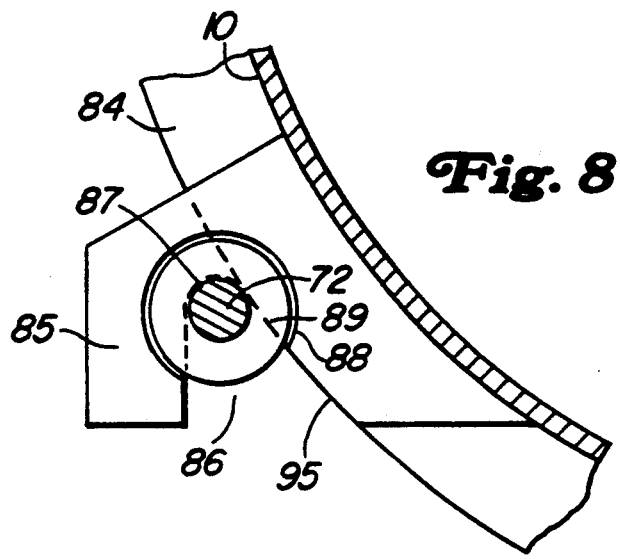
FIG. 8 is a cross section through a hook-shaped projection of the housing of FIG. 2.

The projection 85 is shown in cross section in FIG. 8 extending from the casing 11, and is provided with a slot 86 open downward that ends at its top in a cylindrical fillet 87. The slot 86 widens in the downward direction. On its side 95 facing the housing 10 it has the same cylindrical contour as the outer ring 84. On the side facing the casing 11 the projection 85 is provided with a cylindrical recess 88 oriented concentric to the cylindrical contour of the fillet 87. When assembled, the recess 88 engages a rubber cylinder 89 that is secured to the guide rod 72, as shown in FIG. 4.

Figure 3:
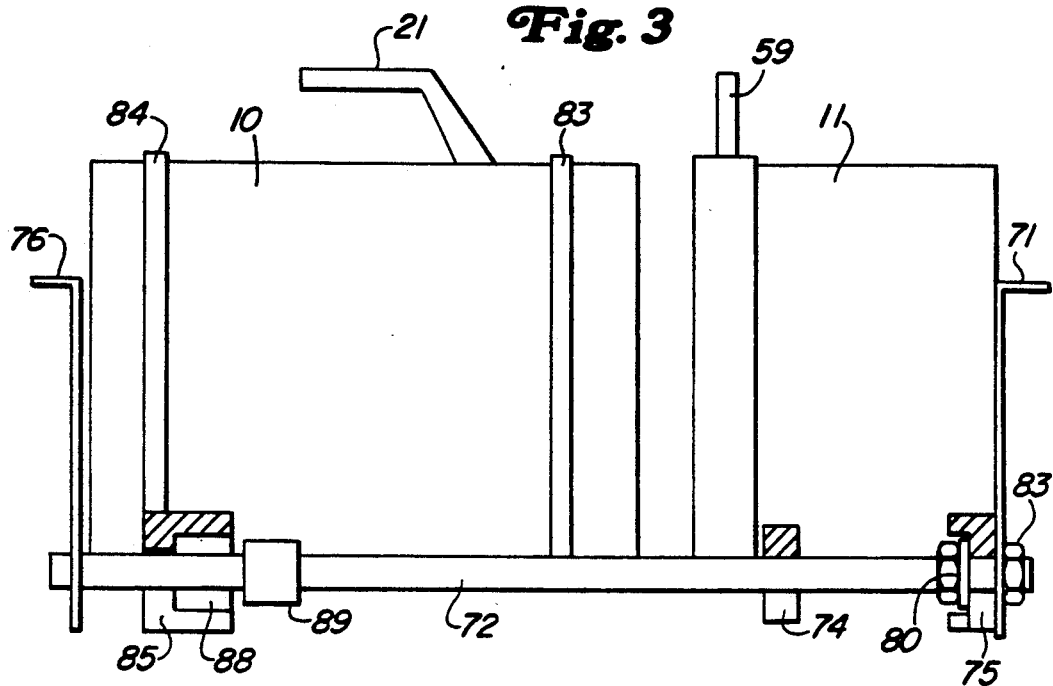
FIG. 3 is a side view, partially sectioned, of the mounting arrangement of FIG. 2 with the air cleaner opened.

Mounting of the air cleaner to the mounting arrangement proceeds as follows:

The completely assembled air cleaner, including the housing 10, casing 11 and locking ring 32, is picked up by the handgrip 21 and brought into position with its axis parallel to the guide rods 72, 73 such that the forward projections 74, 75 and 85, visible in FIG. 2, hook over the forward guide rod 72 and the fillets 76, 77 and 87 and the rings 83, 84 are in contact with the guide rod 72. It should be noted that the air cleaner should be arranged as far as possible to the left side as seen in FIGS. 2 or 3, so that the rubber cylinders 89 do not impede the insertion of the guide rods 72, 73 into the slots 86. The flanged nuts 80 are retracted far to the left. After the air cleaner is brought into contact with the guide rod 72 it is pivoted to the rear about the fillets 76, 77, 87 that remain in contact with the guide rod 72 until it is brought into contact with the rear guide rod 73 with its rings 83, 84 or with the rear projections (not visible in FIG. 2). The complete air cleaner then can be slid along the guide rods until it makes contact with the right side plate 71. The rubber cylinders 89 then will engage the recesses 88, as can be seen in FIG. 4. The housing 10 then can no longer be lifted from the guide rods 72, 73, since the projections 85 enclose the rubber cylinders 89 (see FIG. 8). Finally the flanged nuts 80 are tightened so that their flanges engage the recesses 79 of the projections 75. The nuts 94 then are tightened at the ends of the guide rods 72, 73, so that the projections 75 are clamped between the flanged nuts 80 and the side plate 71. The air cleaner is thereby securely attached to the vehicle chassis. The connections to the raw air inlet 16 and the clean air outlet 17 may be made in the usual manner, and will not be described here.

As will be apparent, it is not necessary to disassemble the entire air cleaner to clean or replace the filter element 13. It is sufficient to rotate the locking ring 32 and thereby release the housing 10 from the casing 11. The housing 10 then can be shifted to the left until the rubber cylinders 89 are retracted from the engagement region of the projections 85, as shown in FIG. 3. The housing 10 with the filter element 13 can then be removed, and the filter element 13 removed and replaced or cleaned. Reassembly of the housing 10 is analogous and performed in reverse order from the above.

Rotation of the locking ring 32 is accomplished using a fold-up lever 59. Preferably, the lever 59 extends into the region which would normally be occupied by an engine hood (not shown) when the bayonet ring 32 is open. This prevents the engine hood from being closed if the air cleaner is not closed. Only after rotating the locking ring 32 and closing the air cleaner can the lever 59 be folded down (as shown in dashed lines in the FIG. 4 as 59a) to permit the engine hood to close.

Figure 5:
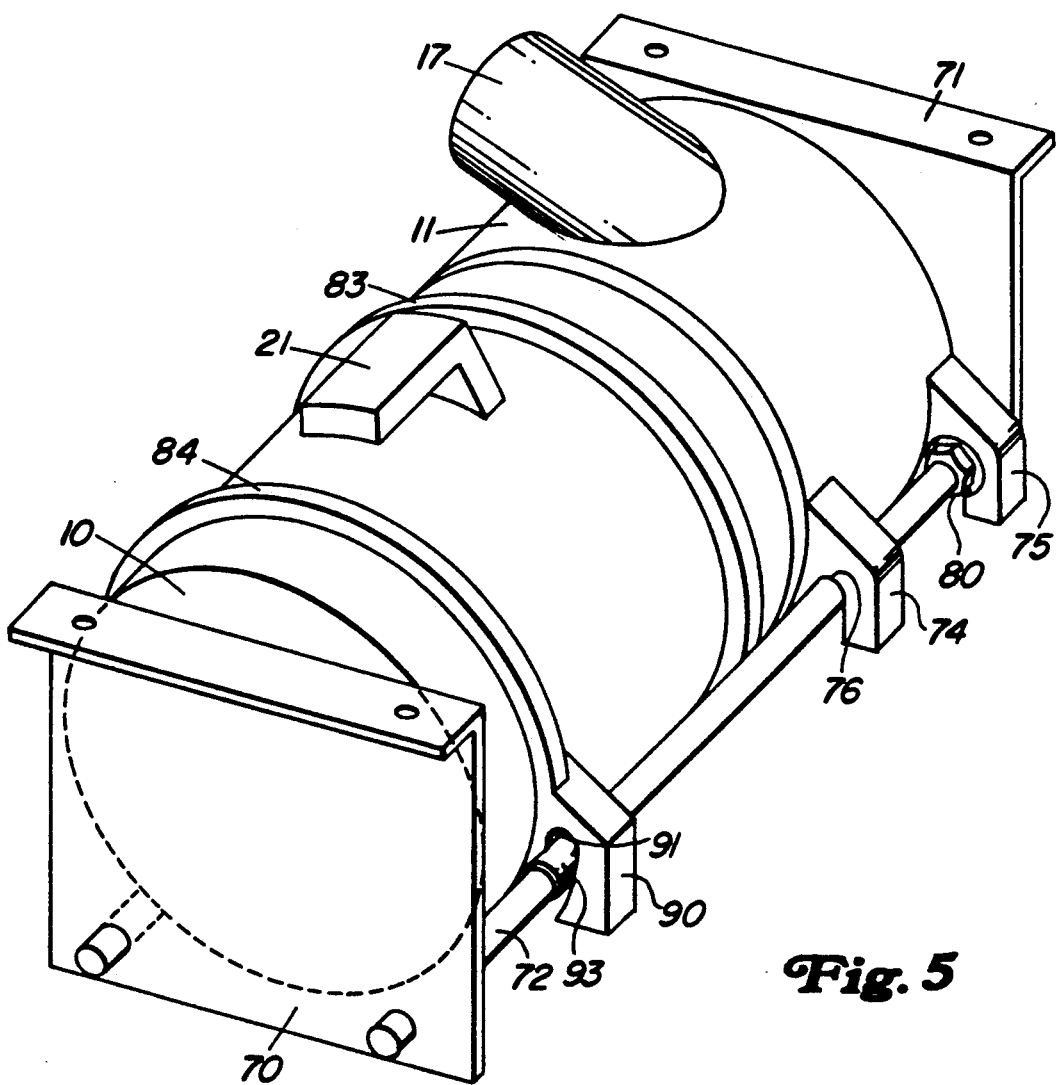
FIG. 5 is a perspective view of a second embodiment of a mounting arrangement for an air cleaner according to the invention.

FIG. 5 shows a second embodiment of a mounting arrangement for an air cleaner according to the invention. The elements in this embodiment which correspond to components of the first embodiment have been indicated with the same part number call-outs, and will not be described further.

In contrast to the air cleaner shown in FIG. 2, in the air cleaner in FIG. 5 the housing 10 and the casing 11 are not connected to each other by a locking or bayonet ring 32. Instead, the casing 11 and the housing 10 are directly provided with bayonet connections. During assembly the housing 10 is guided coaxially into the casing 11 and rotated to engage the casing 11.

With this embodiment, the attachment of the casing 11 to the two guide rods 72, 73 may be fundamentally the same as has already been described for the first embodiment. However, in the second embodiment the projections 90 of the housing 10 are provided with relatively long slots 91 that extend farther in the circumferential direction (see FIGS. 6 and 7) than the slots 86 in the projection 85 of the first embodiment. This permits rotation of the housing 10 to establish the bayonet connection while the guide rods 72, 73 still remain within the slots 91 of the projections 90.

Figure 6:
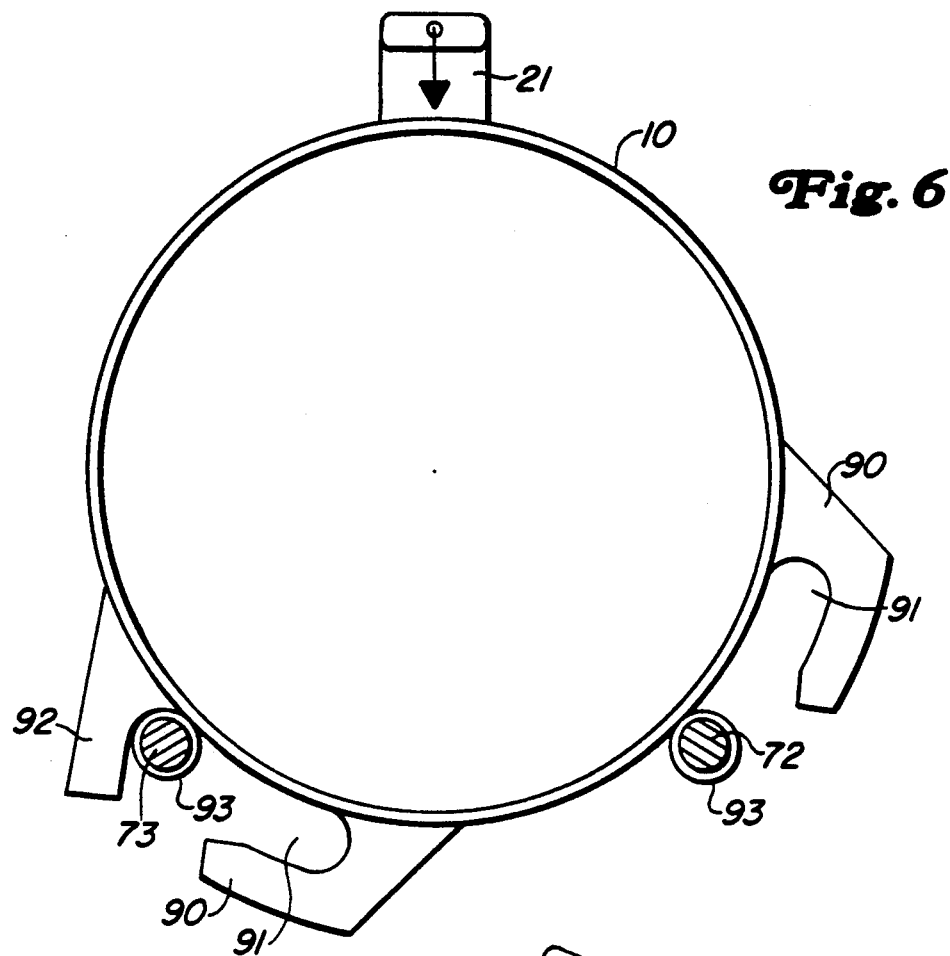
FIG. 6 is a schematic end view of the mounting arrangement of FIG. 5 in the open position.
Figure 7:
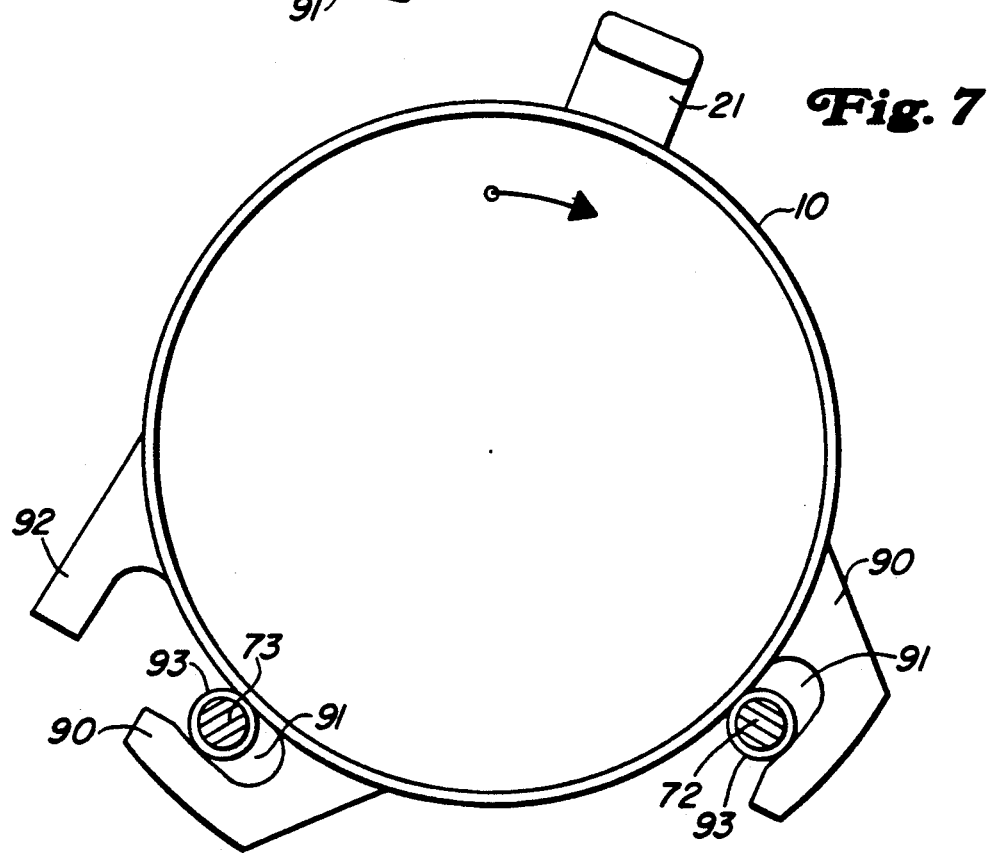
FIG. 7 is a view corresponding to FIG. 6 in the closed position.

FIG. 6 shows a front view of the housing 10 in the open position in which it is possible to lift the housing 10 from the guide rods 72, 73. The rear guide rod 73 is in contact with an additional projection 92 configured as a rotational stop, so that further counterclockwise rotation of the housing 10 is not possible. When the housing 10 is rotated in the clockwise direction to engage the bayonet lock, the hook-shaped projections 90 engage the guide rods 72, 73, enclose them and secure the housing 10 to the guide rods 72, 73. To compensate for tolerances and to avoid rattling noises, the guide rods 72, 73 preferably are coated with rubber 93 in the region of the projections 90.

Assembly of the second embodiment of the air cleaner is performed in a manner analogous to assembly of the first embodiment.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A mounting arrangement for an air cleaner of an internal combustion engine of a vehicle, where the air cleaner has:
   (i) a casing open on one side which is provided with at least one of a raw air inlet and a clean air outlet; and (ii) a pot-shaped housing open on one side, and enclosing a filter element; and (iii) attachment means for selectively attaching the open side of the housing to the open side of the casing;

characterized in that at least two generally horizontal guide rods are mounted to the vehicle structure substantially parallel to each other such that the housing and the casing can be placed on the guide rods in axial alignment with each other and such that at least one of the housing and the casing can be moved axially with respect to the other of the housing and the casing into a position in which the attachment means can attach the housing and the casing together.

2. The mounting arrangement of claim 1, characterized in that the housing and the casing are generally cylindrical.

3. The mounting arrangement of claim 1, further characterized in that guide means are mounted to at least one of said housing and said casing, said guide means being supported on said guide rods.

4. The mounting arrangement of claim 3, further characterized in that said guide means comprises concentric rings of equal outside diameters mounted on the outside of said at least one housing and casing, where said outside diameters are larger than the distance between said two guide rods.

5. The mounting arrangement of claim 3 further characterized in that at least one of said guide rods has a threaded section on at least one end thereof to which fastener means can be applied to fasten said air cleaner to a component of the vehicle structure.

6. The mounting arrangement of claim 5, further characterized in that said at least one threaded guide rod extends through the component of the vehicle structure to which it is mounted, and in that said fastener means comprises two nuts threaded onto said threaded section to clamp said component and at least a portion of said guide means on said casing therebetween.

7. The mounting arrangement of claim 3, further characterized in that said guide means comprises at least one hook-shaped projection mounted to said at least one element, the opening of said hook-shaped projection opening downward and engaging the associated guide rod from above when the air cleaner is assembled.

8. The mounting arrangement of claim 7, further characterized in that said at least one hook-shaped projection is mounted to said housing and the downward-directed opening thereof is provided with a cylindrical recess on the side facing the casing that is concentric with the associated guide rod when the air cleaner is assembled and in that a rubber cylinder is mounted to the associated guide rod and engages said recess when the air cleaner is closed and assembled.

9. The mounting arrangement of claim 1, further characterized in that said attachment means comprises a bayonet lock.

10. The mounting arrangement of claim 9, further characterized in that said bayonet lock comprises bayonet cams mounted around the open side of said housing and a bayonet ring rotatably mounted around the open side of said casing which can be rotated to interact with said cams in the manner of a bayonet connection.

11. The mounting arrangement of claim 9, further characterized in that said bayonet lock comprises bayonet cams mounted around the open side of said casing and said housing, and wherein said housing can be rotated to engage said cams in the manner of a bayonet connection.

12. The mounting arrangement of claim 11, further characterized in that at least one hook-shaped projection is mounted to said housing to selectively engage a corresponding one of said guide rods and extends to such a length that said guide rod is located in the engagement region of the hook-shaped projection during rotation of the housing to engage the lock.

13. The mounting arrangement of claim 12, further characterized in that said corresponding guide rod is provided with rubber sleeves in the region thereof which will be engaged by the hook-shaped projection.

* * * * *